(12) United States Patent
Wastlhuber et al.

(10) Patent No.: US 6,894,984 B2
(45) Date of Patent: May 17, 2005

(54) METHOD AND DEVICE FOR SERIAL DATA TRANSMISSION BETWEEN A POSITION MEASURING SYSTEM AND A PROCESSING UNIT

(75) Inventors: Robert Wastlhuber, Garching/Alz (DE); Erwin Bratzdrum, Hallabruck (DE)

(73) Assignee: Dr. Johannes Heidenhaim GmbH, Traunreut (DE)

( * ) Notice: Subject to any disclaimer, the term of this patent is extended or adjusted under 35 U.S.C. 154(b) by 835 days.

(21) Appl. No.: 09/884,858

(22) Filed: Jun. 18, 2001

(65) Prior Publication Data

US 2002/0015449 A1 Feb. 7, 2002

(30) Foreign Application Priority Data

Jun. 21, 2000 (DE) ........................................ 100 30 357

(51) Int. Cl.[7] .................................................. H04J 1/16
(52) U.S. Cl. ........................ 370/252; 370/508; 370/498
(58) Field of Search ................................ 370/252, 498, 370/337, 347, 350, 503, 508

(56) References Cited

U.S. PATENT DOCUMENTS

| 5,625,353 | A |   | 4/1997 | Katagiri et al. |
| 5,687,103 | A | * | 11/1997 | Hagl et al. .................. 702/150 |
| 5,815,089 | A |   | 9/1998 | Katagiri et al. |
| 6,124,588 | A |   | 9/2000 | Hagl et al. |
| 6,438,386 | B2 | * | 8/2002 | Joshi et al. .................. 455/515 |
| 6,704,685 | B2 | * | 3/2004 | Bratzdrum et al. ......... 702/178 |

FOREIGN PATENT DOCUMENTS

| DE | 30 01 331 | 7/1981 |
| DE | 40 05 087 | 8/1991 |
| DE | 43 44 916 | 6/1994 |
| DE | 43 42 377 | 6/1995 |
| DE | 43 41 787 | 8/1995 |
| DE | 197 14 152 | 8/1998 |
| DE | 198 11 095 | 9/1999 |
| DE | 198 15 647 | 10/1999 |
| DE | 199 04 776 | 8/2000 |
| EP | 0 660 209 | 6/1995 |

OTHER PUBLICATIONS

English language abstract of Japanese Published Application No. 11143502, Patent Abstracts of Japan, published by Japanese Patent Office, 1999, p. 1.
Schneider, Sandro, "Verteilte Intelligenz im CAN–Bus–Verbund," F&M, vol. 104, No. 10, 1996, pp. 757–758.
Bielski, Steffen et al., "Absolute Messsysteme—Sicherheitserwartungen an die Datenerfassung und Datenubertragung," Automatisieren, Nos. ½, 1996, pp. 6, 8, 9, 12, 14.
Pending Claims of Patent Application Assigned to Dr. Johannes Heidenhain GmbH: U.S. Appl. No. 09/884,533, filed Jun. 18, 2001, Inventor: Wastlhuber et al.

* cited by examiner

Primary Examiner—Chau Nguyen
Assistant Examiner—Nittaya Juntima
(74) Attorney, Agent, or Firm—Brinks Hofer Gilson & Lione

(57) ABSTRACT

A method for serial data transmission between a position measuring system and a processing unit that includes transmitting a digital data word of defined length between the processing unit and the position measuring system and having a position data request signal arrive during the transmitting of the digital data word. Determining a position signal regarding a relative chronological position of the position data request signal with respect to the transmitted digital data word and transmitting the determined position signal to the position measuring system.

25 Claims, 2 Drawing Sheets

METHOD AND DEVICE FOR SERIAL DATA TRANSMISSION BETWEEN A POSITION MEASURING SYSTEM AND A PROCESSING UNIT

Applicants claim, under 35 U.S.C. §119, the benefit of priority of the filing date of Jun. 21, 2000 of a German patent application, copy attached, Ser. No. 100 30 357.9, filed on the aforementioned date, the entire contents of which is incorporated herein by reference.

BACKGROUND OF THE INVENTION

1. Field of the Invention

The present invention relates to a method for serial data transmission between a position measuring system and a processing unit, wherein digital data words of defined length are transmitted between the processing unit and the position measuring system. The present invention also relates to a device for executing the method.

2. Discussion of Related Art

Within the scope of serial data transmission between a position measuring system and a subordinated processing unit, for example a numerical machine tool control, defined requirements are made on the selected data transmission. It is necessary, in particular in case of a highly dynamic control on the basis of transmitted position data, that the corresponding data transmission is capable of being interrupted. This means that it should be possible at any time during the data transmission to request actual position data from the position measuring system by an appropriate position data request signal and to make them available to the processing unit in the shortest possible time. Depending on the chronological position of the position data request signal with respect to the just transmitted data word at the time of the request it is, however, not assured that the detection of the actual measured position value, or of the position data, takes place at a defined time. Instead, there is a chronological uncertainty regarding the time of the position detection, which corresponds to the length of the transmission of the respective data word. This is all the more critical if, by such a position data request signal, the actual position data are to be requested from a multitude of position measuring systems. In this case, it is not assured a priori that all contacted position measuring systems actually pick up all the actual position data, or store them in the position measuring system, at the same time following an appropriate request signal.

OBJECTS AND SUMMARY OF THE INVENTION

It is therefore an object of the present invention to disclose a method, as well as a device, for the serial data transmission between a position measuring system and a processing unit, wherein it is assured that the pick-up of position data always takes place at the same time in the position measuring system.

This object is attained by a method for serial data transmission between a position measuring system and a processing unit that includes transmitting a digital data word of defined length between the processing unit and the position measuring system and having a position data request signal arrive during the transmitting of the digital data word. Determining a position signal regarding a relative chronological position of the position data request signal with respect to the transmitted digital data word and transmitting the determined position signal to the position measuring system.

Furthermore, the above object is attained by a device for serial data transmission that includes a processing unit and a position measuring system, wherein a transmission of a digital data word takes place between the processing unit and the position measuring system. The processing unit includes a time determination unit which, in case of a position data request signal arriving during the transmission of the digital data word, determines a position signal regarding a relative chronological position of the position data request signal with regard to the transmitted data word. The position measuring system includes a control unit, which processes a position signal transmitted by the processing unit in such a way that, after a constant total time following the arrival of the position data request signal, a determination of an actual position data takes place in the position measuring system.

The steps in accordance with the present invention now assure that, in particular also in case of the requested position data determination during the running data transmission, the position data, or measured position values, are always detected, or stored, in the position measuring system at defined times. This is also assured in this case if, for example, it is intended to interrogate a multitude of position measuring systems at the same time.

It is therefore possible by the present invention, which will be explained in detail in what follows, that there are always defined equidistant time intervals available between the intervals in which, for example, a subordinated position control circuit determines position data. In this case, these time intervals can be predetermined by the respective position control circuit and do not depend on the preset transmission protocol. The result in the end is the independence of the position control cycle times from the type of data transmission.

Moreover, it should be mentioned as an advantage of the present invention that the proposed steps can also be provided in connection with diverse position data request signals. For example, it is possible to provide position data request signals for requesting position data for position control, or for digitizing a workpiece shape scanned by a scanning system; different processing priorities are provided for both processing priorities.

Further advantages, as well as details of the present invention ensue from the following description of the attached drawings.

DETAILED DESCRIPTION OF THE PREFERRED EMBODIMENTS

Figure 1A:
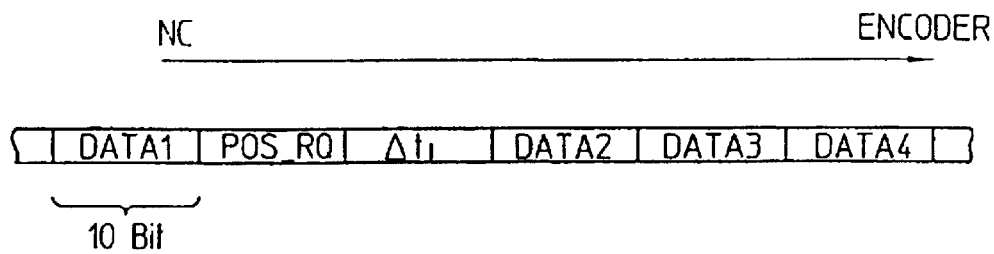
FIG. 1a represents a chronological section of an embodiment of a transmission protocol of the data transmitted between a processing unit and a position measuring system according to the present invention.
Figure 1B:
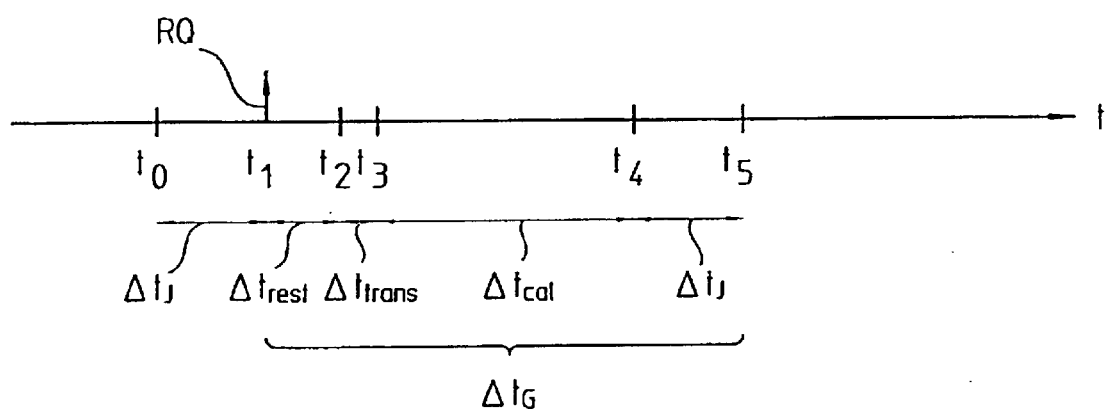
FIGS. 1b and 1c, respectively show the chronological sequence of an embodiment of events following the arrival of a position data request signal according to the present invention.
Figure 1C:
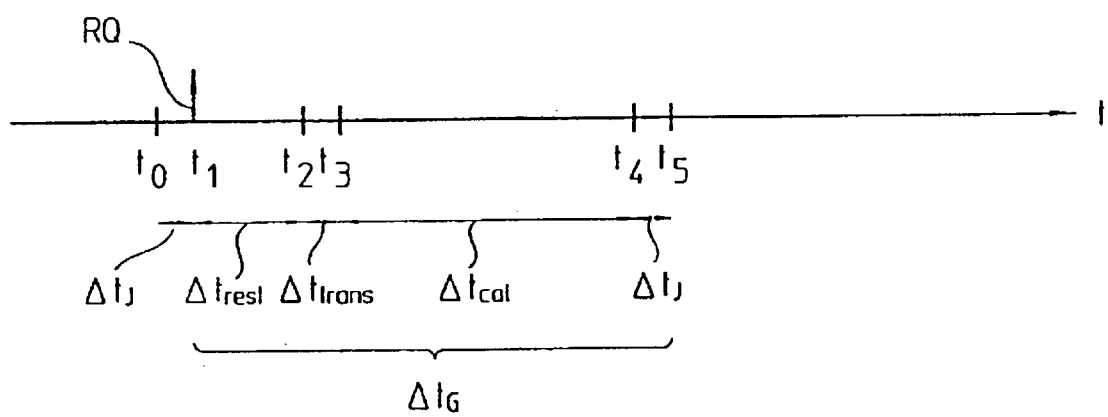

The present invention will be explained in what follows by two examples shown in FIGS. 1a to 1c. Here, FIG. 1a represents a chronological section of a transmission protocol between a processing unit (NC) and a position measuring system (ENCODER), i.e. the data transmitted from the processing unit to the position measuring system within a defined time interval. The data transfer in the other direction, i.e. from the position measuring system to the processing unit, is not represented.

There are various possibilities within the scope of the present invention regarding the actual layout of an appropriate interface. For example, in an advantageous embodiment it can be provided to employ a separate data channel for each direction of transmission. In this case, a first data channel is used for data transfer from the processing unit to the position measuring system, and a second data channel is used for data transmission from the position measuring system to the processing unit.

The position measuring system employed can be a known incremental or absolute position measuring system of a machine tool, wherein the respective position data are processed in the customary way for serial transmission. Then the position data and possibly further data are transmitted from the position measuring system to the processing unit as digital data words DATA1 to DATA4, or as data packets, consisting of a plurality of such data words DATAn.

The processing unit is embodied as a numerical machine tool control. A transmission of data in the form of digital data words DATA, or in the form of corresponding data packets, takes place from the processing unit to the position measuring system in the same way, i.e. bidirectional communication is provided between the position measuring system and the processing unit. The transmission of commands, etc., is of course also possible besides the data actually to be transmitted, such as position data, parameter data, etc.

In the present example, digital data words DATA1 to DATA4 of a word length of 10 bits are exchanged between the position measuring system and the processing unit. However, it is of course also possible within the scope of the present invention to provide other word lengths. Now the case will be explained by FIGS. 1a and 1b, wherein during the transmission of a data word DATA1 from the processing unit to the position measuring system, which starts at the time $t_o$, a position data request signal RQ is received in the processing unit. For example, a position control circuit can request up-to-date position data by an appropriate position data request signal RQ. In the present example, the soonest possible transmission of the actual position data by such a position data request signal RQ is requested from the position measuring system at the time $t_1$. In principle, the time when such a position data request signal RQ finally arrives is not fixed a priori. Accordingly, the relative chronological position of the position data request signal RQ in relation to the just transmitted data word DATA1 is not known. Without taking further steps, there would be a chronological uncertainty $\Delta t$ regarding the later detection time of the position data, which corresponds to the time required for transmitting a data word DATA1. In the case of a data word DATA1 of a length of 10 bits, as in the present example, and a data transmission rate of 30 Mbits/sec, this would correspond to a chronological uncertainty $\Delta t=10$ bits/(30 Mbits/sec)=333 ns. Such an uncertainty on the part of the processing unit would, in turn, result in a corresponding uncertainty in the further signal processing.

To remove this uncertainty it is therefore provided as an essential step of the present invention to detect, or determine, a position signal describing the relative chronological position of the position data request signal RQ in relation to the just transmitted data word DATA1, or possibly the data packet. In the present example, the time difference $\Delta t_j$ between the start of the transmission of the data word DATA1 and the arrival of the position data request signal RQ is determined as the appropriate position signal, i.e. the time between the two times $t_0$ and $t_1$. Such a time determination can be performed, for example, with the aid of a suitable counter which, starting with the transmission of the data word DATA1, counts up in defined time intervals $\Delta t_z$ from $t_0$ and in this way determines the time difference $\Delta t_j = Z^* \Delta t_z$, wherein $Z=Z(t_1)-Z(t_0)$, i.e. $Z(t_n)$ is the respective count at the time $t_n$. It is therefore necessary to assure at the start of each data word that counting commences, starting with a certain, or defined, counter starting value $Z(t_0)=0$, or $Z(t_0)=15$. Therefore the counter must be set back to the appropriate counter starting value $Z(t_0)$ after the transmission of each digital data word, or prior to the transmission of each digital data word. Of course, basically a countdown from a suitable counter starting value $Z(t_0)$ could also take place.

Alternatively to this, an appropriate position signal could also provide the approximate chronological distance between $t_1$ and $t_2$, i.e. the chronological distance between the arrival of the position data request signal RQ and the end of the transmission of the data word DATA1. In the same way it would be possible to determine the relative position of the signal RQ at any arbitrarily selected time during the transmission of the data word DATA1, etc.

As soon as the transmission of the actual data word DATA1 is ended at the time $t_2$, a position data request command POS_RQ in the form of a digital data word is subsequently transmitted from the processing unit to the position measuring system, by which the determination of the actual position data in the position measuring system is requested. The same as all transmitted digital data words in this example, this data word also has a word length of 10 bits.

The transmission of the position data request command POS_RQ is followed by the transmission from the processing unit to the position measuring system of the position signal previously determined by the position measuring system, or of the time difference $\Delta t_j$. The determined time difference $\Delta t_j$ is also serially transmitted in the form of a digital 10 bit data word.

The processing of the various transmitted data by the position measuring system will now be explained in a first case with the aid of the time diagram in FIG. 1b.

The transmission of the data word DATA1 to the position measuring system, during the transmission of which a position data request signal RQ arrived at the time $t_1$, is terminated at the time $t_2$. The time interval between the time $t_1$ and the end of the transmission of the data word DATA1 at the time $t_2$ is identified in FIGS. 1b and 1c by $\Delta t_{rest}$. The time interval $\Delta t_{trans}$ ($t_2$, $t_3$) following $t_2$ prior to the further signal processing in the position measuring system is defined by the length of the transmission of the two digital data words regarding the position data request command POS_RQ and the time difference $\Delta t_j$. The value of the time interval $\Delta t_{trans}$ here is a function of the length of the respective transmission distance between the position measuring system and the processing unit.

On the part of the position measuring system, a. time interval $\Delta t_{cal}$ between the times $t_3$ and $t_4$ follows the time $t_3$ after the finished transmission of the position data request command POS_RQ and the time difference $\Delta t_j$. The time interval $\Delta t_{cal}$ is needed for processing the transmitted data words regarding the position data request command POS_RQ and the time difference $\Delta t_j$ by the position measuring system.

In principle, following the appropriate processing of the received data, it would now be immediately possible for the position measuring system to determine, or store, the actual position data. However, because of the above mentioned chronological uncertainty Δt regarding the time of the arrival of the position data request signal RQ, it would not be assured in this case that a clearly defined time for detecting position data is available starting at the time $t_1$.

Therefore the time difference $\Delta t_j$ determined in accordance with the present invention is allowed to pass, starting at the time $t_4$, until the actual position data are finally detected, or stored, in the position measuring system. Thus, a defined, constant total time $\Delta t_G$ lies between the time of the arrival of the position data request signal RQ at the time $t_1$ and the detection time $t_5$.

Therefore, as previously explained, the total time $\Delta t_G$ in the example is additively composed of 1) the remaining transmission time $\Delta t_{rest}$ of the just transmitted data word DATA1,
2) the required transmission time $\Delta t_{trans}$ for transmitting the position data request command POS_RQ and the transmission of the time difference $\Delta t_j$,
3) the required processing time $\Delta t_{cal}$ for evaluating the position data request command POS_RQ and the transmitted time difference $\Delta t_j$, as well as
4) the transmitted time difference $\Delta t_j$, i.e.

$$\Delta t_G = \Delta t_{rest} + \Delta t_{trans} + \Delta t_{cal} + \Delta t_j.$$

In a possible embodiment, a counter is also provided in the position measuring system, which counts up, starting at the time $t_4$, i.e. from the time when the evaluation of the position data request command POS_RQ and the transmitted time difference $\Delta t_j$ is finished, in amounts of the time difference $\Delta t_j$ until the time $t_5$. As explained, at the time $t_5$ the determination of the actual position data takes place. In the same way, a countdown by the appropriate counter or the like is here of course alternatively possible.

The case of transmission distances of different lengths between different position measuring systems and a central processing unit can also be taken into consideration within the scope of the present invention. Transmission distances of different lengths would possibly result in different transmission times $\Delta t_{trans}$ and, in turn, also undesirably varying total times $\Delta t_G$. In such a case it would be necessary prior to placing the system into operation to determine the various transmission times $\Delta t_{trans}$ for the different position measuring systems with varying transmission distances. During actual operations it would then be necessary for all position measuring systems used to take a transmission time $\Delta t_{trans}$ into consideration, which is oriented to the maximum transmission time $\Delta t_{trans}$ for the longest transmission distance. For example, this could be effected by an appropriate starting counting value in the position measuring system, which is determined specifically, or as a function of the length of the transmission distance for each position measuring system, and is preset. The desired constant total time $\Delta t_G$ for all the different position measuring systems would therefore again be assured in this way.

It is now important for the present invention that the determination of the actual position data at a defined time also takes place in the case of the arrival of the position data request signal RQ at another time during the transmission of the data word DATA1, namely at a time which follows the time of the arrival of the position data request signal RQ by the total time $\Delta t_G$, explained above. This case is illustrated in FIG. 1c and will be briefly explained in what follows.

Differing from the previous example, the position data request signal RQ now arrives during the transmission of the data word DATA1 at a slightly earlier time $t_1$. As above, the determination of the time difference $\Delta t_j$ between the start of the transmission of the data word DATA1 and the time $t_1$ again takes place. Following the transmission of the remaining data word during the time interval $t_{rest}$, as well as the two data words regarding the position data request command POS_RQ and the time difference $\Delta t_j$, the requested position is again determined by the position measuring system at the time $t_5$. Following the end of the transmission of the various data words and the time $\Delta t_{trans}$ required for this, the time $\Delta t_{cal}$ is required for processing the received data and, in accordance with the present invention, the time difference $\Delta t_j$ is allowed to pass before the actual position at the time $t_5$ is stored, as mentioned above. On the basis of the steps in accordance with the present invention, the total time $\Delta t_G$ between the arrival of the position data request signal RQ at the time $t_1$ and the time $t_5$ of its determination now corresponds to the total time $\Delta t_G$ which also passed in the previous case between $t_1$ and $t_5$. It is thus assured that the determination of the actual position data takes place in every case at a defined known time after the arrival of the position data request signal RQ. The chronological uncertainty Δt because of the initially unknown chronological position of the position data request signal RQ in regard to the just transmitted data word DATA1 has therefore been compensated.

Besides the processing of the position data request signal RQ, by which actual position data for a position regulation are requested as quickly as possible, the processing of a position data request signal RQ', by which position data for digitizing a scanned workpiece shape are requested from the position measuring system, for example, is also possible within the scope of the present invention. It is therefore possible to request position data with defined processing priorities from the position measuring system for processing in the processing unit. Digitizing of the shape of a workpiece customarily takes place with the aid of a scanning system, which scans the shape of the respective workpiece and, in case a scanning signal is generated, transmits the actual position data from the scanning system, which are finally determined via the position measuring system, to the processing unit. While the position data for a position control must be extremely rapidly available, in particular in case of a highly dynamic control, the further processing of the position data for digitizing a workpiece shape is less time-critical. For this reason it is possible to provide several position data request signals RQ, which are assigned different processing priorities. For example, a first position data request signal RQ is provided, which causes a transmission of position data to the processing unit at the highest processing priority, which are used there for position control. Furthermore, there is at least one second position data request signal RQ' which, at a lower processing priority, causes a transmission of the actual position data to the processing unit, which then are used there for digitizing a workpiece shape.

The processing priorities assigned to the different position data request signals RQ, RQ' have as a result that another priority differentiation in the position interrogation is possible in this way. For example, the currently running transmission of position data to the processing unit, which are needed there for digitizing and have been requested by the lower-priority position data request signal RQ', can be interrupted. Here, the interruption takes place by the appropriate position data request signal RQ having the highest processing priority, which causes an immediate transmission of position data for position control to the processing unit. It is of course also possible to provide more than two position data request signals RQ with appropriate processing priorities.

Such different processing priorities result in defined steps in connection with the present invention. It must be assured in every case that position data which have been requested by means of position data request signals RQ of a common processing priority are determined at defined times or, in case of regularly requested position data, they are determined within equidistant time intervals.

Therefore, total times $\Delta t'_G$ are fixed for position data which are called up with lower processing priority, which are clearly greater than the total time $\Delta t_G$ for processing the position data request signals RQ with the highest priorities. The total time $\Delta t_G$ for processing the position data request signals RQ with the highest priorities is basically chosen to be as short as possible because of the rapid answer required. The modified total time $\Delta t'_G$ for position data request signals of lower priority therefore results as the total time $\Delta t'_G = \Delta t_G + \Delta t_{prior}$. Then, the value $\Delta t_{prior}$, or the total time $\Delta t'_G$, for the position data request signal RQ' with the second-highest processing priority is calculated in such a way that the request of a position data request signal RQ of the highest processing priority can possibly also be processed within the increased total time $\Delta t'_G$. Correspondingly, the total time $\Delta t'_G$ for a possibly present position data request signal of the third-highest processing priority would have to be chosen to be sufficiently large, so that it is again possible in every case to process the request for a position data request signal RQ' of the second-highest priority within this time, etc.

The respective times $\Delta t_G$, $\Delta t'_G$ between the arrival of a position data request signal RQ and the determination of the actual position data can be checked with the aid of appropriate counters, again as explained above.

Figure 2:
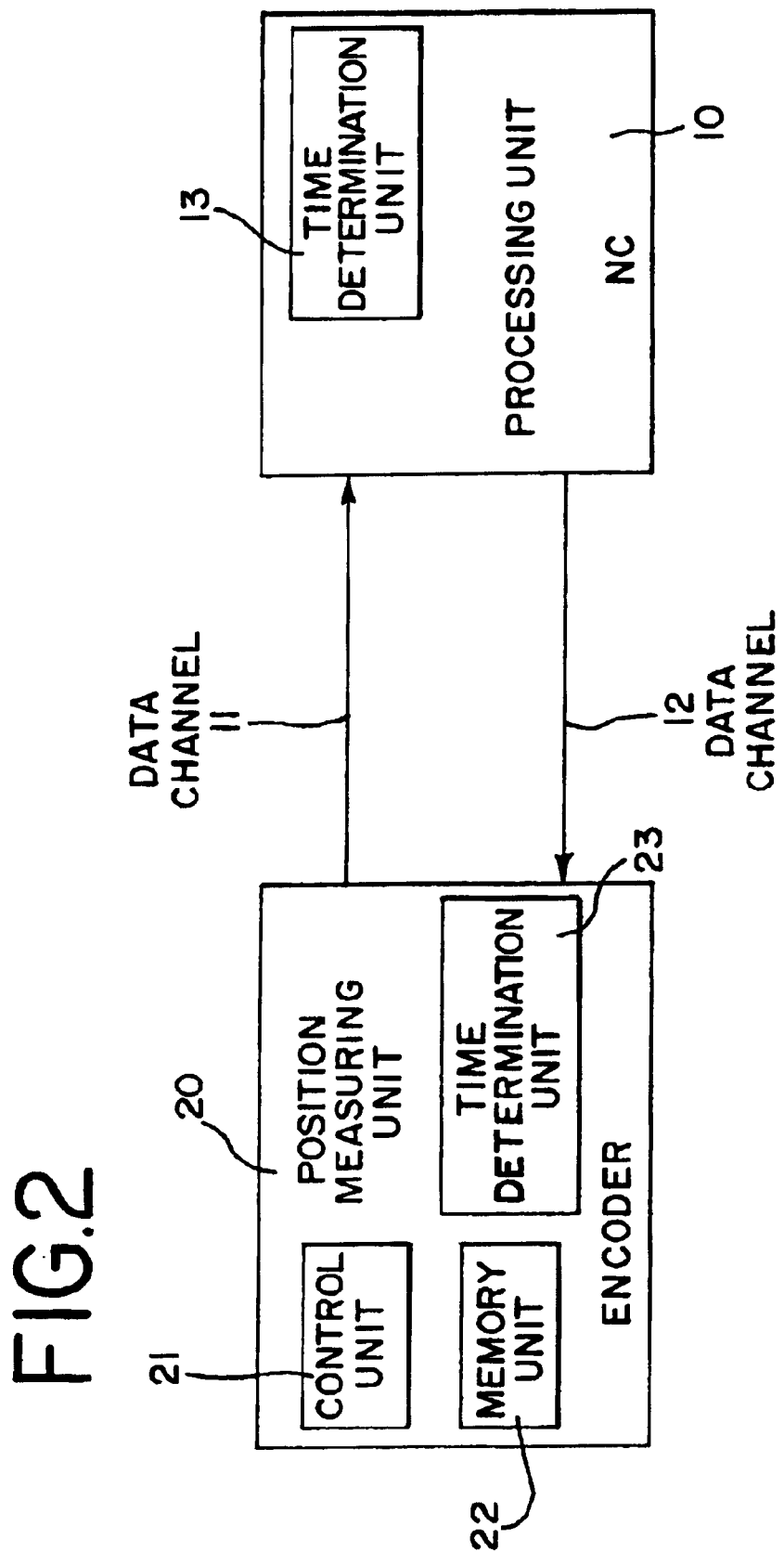
FIG. 2 is a greatly schematized representation of a possible embodiment of a device in accordance with the present invention.

An exemplary embodiment of the device in accordance with the present invention is represented in a greatly schematized manner in FIG. 2. One the one hand, it includes a position measuring system 20, by which the relative positions of two elements of a machine tool, which are movable with respect to each other, are determined, for example. On the other hand, a processing machine 10 is provided, possibly embodied as the numerical control of a machine tool, which further processes the data provided by the position measuring system.

In the present example, two separate data channels 11, 12 are used for bidirectional data transmission between the position measuring system 20 and the processing unit 10. In this case, data transmission from the position measuring system 20 to the processing unit 10 takes place via a first data channel 11, data from the processing unit 10 to the position measuring system 20 are transmitted via a second data channel 12.

In FIG. 2, only the components of the position measuring system 20 and the processing unit 10 relevant to the present invention are schematically indicated. The structure of these units is otherwise sufficiently known to one skilled in the applicable art.

Thus, only a time determination unit 13 is schematically indicated within the processing unit 10, by which, as explained above, the relative chronological position of the position data request signal RQ in relation to the just transmitted data word is determined when a position data request signal RQ arrives during the transmission of a data word DATA1. If, as described above, the time difference $\Delta t_J$ between the start of the transmission of the data word DATA1 and the arrival of the position data request signal RQ is determined, the corresponding time determination unit 13 is preferably embodied as a counter.

A control unit 21 of the position measuring system 20 is schematically represented, which performs the above explained signal processing in the position measuring system 20. To this end, the position signal transmitted by the processing unit 10 is processed by the control unit 21 in such a way that a determination of the actual position data takes place in the position measuring system 20 in a constant total time $\Delta t_G$ after the receipt of the position data request signal RQ. In this case, the control unit 21 can be embodied as a processor, as well as a permanently wired logic circuit.

A memory unit 22, in which the actually determined position data are finally stored before they are processed and transmitted to the processing unit, is furthermore indicated in the position measuring system 20, besides the control unit 21.

Moreover, also as mentioned above, a time determination unit 23 is provided in the position measuring system 20, which is used to count up the time difference $\Delta t_J$ following the end of the processing of the transmitted position data request command POS_RQ and the time difference $\Delta t_J$ until the time at which the position data are determined. As indicated above, the time determination unit 23 is also embodied as a counter.

With the exception of the described components, the processing unit 10, as well as the position measuring system 20, essentially has the customarily known layout.

The foregoing description is provided to illustrate the invention, and is not to be construed as a limitation. Numerous additions, substitutions and other changes can be made to the invention without departing from its scope as set forth in the appended claims.

We claim:

1. A method for serial data transmission between a position measuring system and a processing unit, comprising
   transmitting a digital data word of defined length between said processing unit and said position measuring system;
   having a position data request signal arrive during said transmitting of said digital data word;
   determining a position signal regarding a relative chronological position of said position data request signal with respect to said transmitted digital data word; and
   transmitting said determined position signal to said position measuring system.

2. The method in accordance with claim 1, further comprising determining as said position signal a time difference between a start of said transmission of said digital data word and said arrival of said position data request signal.

3. The method in accordance with claim 1, further comprising assuring, with the aid of said transmitted position signal, that actual position data are determined after a defined total time following said arrival of said position data request signal.

4. The method in accordance with claim 3, further comprising storing said determined actual position data in said position measuring system.

5. The method in accordance with claim 2, further comprising transmitting a position data request command in the form of a digital data word to said position measuring system following said transmission of said digital data word.

6. The method in accordance with claim 3, further comprising transmitting a position data request command in the form of a digital data word to said position measuring system following said transmission of said digital data word.

7. The method in accordance with claim 5, further comprising transmitting said determined time difference as a digital data word to said position measuring system following the transmission of said position data request command.

8. The method in accordance with claim 7, wherein a predetermined total time between said arrival of said position data request signal and a determination of an actual position data is composed at least in part of the summation of:
- a remaining transmission time of said transmitted digital data word,
- a required transmission time for transmitting said position data request command and said transmission of said time difference,
- a required processing time for evaluating said position data request command and said transmitted time difference, and
- said transmitted time difference.

9. The method in accordance with claim 2, wherein said time difference is determined with the aid of a counter.

10. The method in accordance with claim 9, further comprising setting said counter back to a defined starting counter value at a start of said transmission of said digital data word.

11. The method in accordance with claim 8, further comprising compensating for a required transmission time of a second position measuring system for transmitting a second position data request command and a transmission of a time difference to said processing unit, wherein said required transmission time of said second position measuring system differs from said required transmission time of said position measuring system.

12. The method in accordance with claim 11, wherein said difference between said required transmission times of said position measuring system and said second position measuring system is caused by transmission distances of different length in said position measuring system and said second position measuring system.

13. The method in accordance with claim 11, wherein said compensating comprises assigning a common predetermined transmission time for said position measuring system and said second position measuring system, so that a common predetermined total time results for said position measuring system and said second position measuring system.

14. The method in accordance with claim 12, wherein said compensating comprises assigning a common predetermined transmission time for said position measuring system and said second position measuring system, so that a common predetermined total time results for said position measuring system and said second position measuring system.

15. The method in accordance with claim 14, wherein said common predetermined transmission time corresponds to a maximum transmission time associated with a longest transmission distance between said position measuring system and said second position measuring system.

16. The method in accordance with claim 3, wherein a second position data request signal is generated that has a total time and a lower processing priority than said position data request signal, said method further comprises assigning values of said total times of said position data request signal and said second position data request signal that are dependent on said processing priorities of said position data request signal and said second position data request signal.

17. The method in accordance with claim 16, wherein said assigning comprises assigning a lower value of said total times to said position measuring system based on said position data request signal having a higher processing priority than said second position data request.

18. A device for serial data transmission comprising:
- a processing unit;
- a position measuring system, wherein a transmission of a digital data word takes place between said processing unit and said position measuring system,
- wherein said processing unit comprises a time determination unit which, in case of a position data request signal arriving during said transmission of said digital data word, determines a position signal regarding a relative chronological position of said position data request signal with regard to said transmitted data word, and
- wherein said position measuring system comprises a control unit, which processes a position signal transmitted by said processing unit in such a way that, after a constant total time following the arrival of said position data request signal, a determination of an actual position data takes place in said position measuring system.

19. The device in accordance with claim 18, wherein a time difference between a start of said transmission of said digital data word and said arrival of said position data request signal is used as said position signal.

20. The device in accordance with claim 19, wherein said time determination unit of said processing unit comprises a counter.

21. The device in accordance with claim 19, wherein a second time determination unit for determining a constant total time is arranged in said position measuring system.

22. The device in accordance with claim 21, wherein said second time determination unit of said position measuring system comprises a counter.

23. The device in accordance with claim 18, wherein said position measuring system comprises a memory unit for storing an actually determined position data.

24. The device in accordance with claim 18, wherein said control unit comprises a processor.

25. The device in accordance with claim 18, wherein said control unit comprises a logic circuit.

* * * * *